United States Patent
Kretschmann et al.

(10) Patent No.: US 9,513,192 B2
(45) Date of Patent: Dec. 6, 2016

(54) METHOD AND DEVICE FOR ESTIMATING A PROFILE DEPTH OF A TIRE

(71) Applicant: CONTINENTAL AUTOMOTIVE GMBH, Hannover (DE)

(72) Inventors: Matthias Kretschmann, Regensburg (DE); Thomas Haas, Donaustauf (DE)

(73) Assignee: Continental Automotive GmbH, Hannover (DE)

( * ) Notice: Subject to any disclaimer, the term of this patent is extended or adjusted under 35 U.S.C. 154(b) by 54 days.

(21) Appl. No.: 14/417,216

(22) PCT Filed: Jul. 18, 2013

(86) PCT No.: PCT/EP2013/065165
§ 371 (c)(1),
(2) Date: Jan. 26, 2015

(87) PCT Pub. No.: WO2014/016195
PCT Pub. Date: Jan. 30, 2014

(65) Prior Publication Data
US 2015/0247780 A1 Sep. 3, 2015

(30) Foreign Application Priority Data
Jul. 24, 2012 (DE) ........................ 10 2012 212 934

(51) Int. Cl.
*G01M 17/02* (2006.01)
*B60C 23/04* (2006.01)
*B60C 23/06* (2006.01)
*B60C 11/24* (2006.01)

(52) U.S. Cl.
CPC .......... *G01M 17/025* (2013.01); *B60C 11/243* (2013.04); *B60C 23/0411* (2013.01); *B60C 23/064* (2013.01); *B60C 11/246* (2013.04)

(58) Field of Classification Search
None
See application file for complete search history.

(56) References Cited

U.S. PATENT DOCUMENTS 5,749,984 A   5/1998  Frey et al.
5,827,957 A *  10/1998 Wehinger ............ B60C 23/0408
                                                   701/33.8
6,634,223 B2  10/2003 Hartmann et al.
(Continued)

FOREIGN PATENT DOCUMENTS

DE          60106400 T2    11/2005
DE         102006028411 A1  12/2007
(Continued)

*Primary Examiner* — Andre Allen
(74) *Attorney, Agent, or Firm* — Laurence A. Greenberg; Werner H. Stemer; Ralph E. Locher

(57) ABSTRACT

A method and a device estimate a profile depth of a tire of a vehicle during operation of the vehicle. The method measures signals from a piezoelectric element which is disposed on an inner side of the tire in a region which deforms in the event of tread shuffle. The measured signals or actual data derived from the signals are compared with comparison data. The comparison data contain data sets which each indicate signals to be expected for a profile depth or actual data which are to be expected. The profile depth is then estimated on the basis of the comparison of the signals or of the actual data with the comparison data.

12 Claims, 15 Drawing Sheets

(56) References Cited

U.S. PATENT DOCUMENTS

| | | | |
|---|---|---|---|
| 7,168,308 B2 | 1/2007 | Mancosu et al. | |
| 8,061,191 B2 | 11/2011 | Hanatsuka | |
| 8,332,092 B2 | 12/2012 | Laermer et al. | |
| 8,794,058 B2 | 8/2014 | Bigot et al. | |
| 2011/0118989 A1* | 5/2011 | Morinaga | B60C 11/24 702/34 |
| 2012/0266649 A1* | 10/2012 | Paturle | B60C 11/24 73/8 |
| 2013/0278406 A1 | 10/2013 | Weston | |
| 2014/0163816 A1* | 6/2014 | Singh | B60W 40/10 701/34.4 |
| 2014/0232852 A1* | 8/2014 | Nobis | G01B 11/22 348/128 |
| 2016/0033367 A1* | 2/2016 | Unterreiner | G01M 17/022 73/8 |

FOREIGN PATENT DOCUMENTS

| | | |
|---|---|---|
| DE | 102008057542 A1 | 7/2009 |
| DE | 102008002722 A1 | 12/2009 |
| DE | 102009006458 A1 | 8/2010 |
| DE | 102010016551 A1 | 10/2011 |
| EP | 1225066 A2 | 7/2002 |
| EP | 1293362 A2 | 3/2003 |
| EP | 1314580 A1 | 5/2003 |
| JP | 2007153034 A1 | 6/2007 |
| WO | 2012091719 A1 | 7/2012 |

* cited by examiner

METHOD AND DEVICE FOR ESTIMATING A PROFILE DEPTH OF A TIRE

BACKGROUND OF THE INVENTION

Field of the Invention

The present invention relates to a method and a device for estimating a profile depth of a tire of a vehicle during the operation of the vehicle.

The profile depth of a tire has a significant influence on the behavior of a motor vehicle. This especially applies in critical driving situations. On the one hand the maximum adhesion between the tire and the road is strongly dependent on the respective road conditions. On the other hand the adhesion can be optimized for the respective conditions by means of various tire characteristics. These include a rubber mixture matched to seasonal temperature conditions, an optimally adjusted tire pressure and a tire profile optimized for the weather conditions. The effectiveness of the tire profile is largely determined by the profile depth.

Ultimately, only an adequate profile depth can ensure the best possible adhesion between the tire and the road, especially in critical driving situations. For this reason many legislators prescribe a minimum profile depth. Said minimum profile depth can vary from country to country and moreover also by season. The minimum value is 1.0 mm; the value is often 1.6 mm; the maximum is 6.0 mm under weather conditions in Ukraine. In regions in which driving takes place both with summer tires and also with winter tires, a check takes place as to whether the corresponding minimum profile depths are present, generally twice a year during seasonal tire changes, and are carried out by the appropriate workshop. The measurement takes place in general with mechanical profile depth measurement devices at a plurality of points of each wheel. In countries in which driving with all-season tires takes place, it can however occur that the tires are not tested at all.

Thus there is far from systematic profile depth testing in daily vehicle operation. This can result in critical driving situations that ultimately result in avoidable accidents.

DE 10 2008 002 722 A1 discloses a method for estimating a profile depth of a tire that can be carried out during the operation of the vehicle. It is based on analyzing the data of an acceleration sensor that is disposed in the tire.

EP 1 225 066 A2 also discloses a method for profile depth estimation while the tire is rolling. It is based on detecting the body vibrations and sound in solids vibrations of the tire or of chassis parts or body parts produced by the profile. This can for example be carried out by a vibration sensor on the body parts or chassis parts or by a microphone that is disposed near the tire.

The profile depth estimation method according to EP 1 314 580 A1 is based on magnetically conductive, in particular ferromagnetic, elements that are mounted in the tread strips of the tire in different positions. With wear of the profile the tread strips lose said magnetically conductive elements. An analysis unit close to the tire can detect the number of the magnetically conductive element and thus deduce the profile depth.

DE 10 2008 057 542 A1 discloses a profile depth estimation method that can be carried out during the operation of the vehicle and that is based on a laser transmitting unit and a receiving unit in the form of a photodiode.

BRIEF SUMMARY OF THE INVENTION

Starting from said prior art, it is an object of the present invention to provide a further method for estimating a profile depth of a tire of a vehicle that can be carried out during the operation of the vehicle. Moreover, it is an object of the present invention to propose a suitable device for carrying out the method.

The objects mentioned are achieved by the subject matter of the independent claims. The dependent claims claim embodiments of the invention.

Accordingly, the invention comprises a method for a profile depth of a tire of a vehicle during the operation of the vehicle. The method according to the invention uses a piezoelectric element that is disposed on the inside of the tire in a region that is deformed by tread shuffle. The inside of the tire has a broad meaning in this context. For example, it can be that the piezoelectric element is glued onto the inside of the tire or even vulcanized in the tire. Particular advantages arise if the piezoelectric element is disposed close to the so-called neutral chord. The neutral chord can be a fabric embedded in the rubber mixture that deforms but cannot stretch or shorten. The method according to the invention measures signals of the piezoelectric element and compares the signals or actual data derived from the signals with comparison data. The comparison data preferably includes records that indicate the signals to be expected or the actual data to be expected for each profile depth of the tire. The profile depth of the tire is estimated based on the comparison of the signals or the actual data with the comparison data.

A basic idea of the invention is that the signals of a piezoelectric element change in the event of tread shuffle depending on the profile depth of the tire. Using the piezoelectric element, the profile depth of the tire can be estimated reliably and inexpensively.

In one embodiment, the method according to the invention determines a record of the comparison data that has the greatest similarity to the signals or the actual data. The profile depth is then estimated by determining a profile depth associated with the record. This enables the profile depth to be determined simply.

Depending on the embodiment, actual data can be derived from the measured signals. In one embodiment, voltage values of the piezoelectric element are measured as signals and the step of deriving actual data from the measured signals includes the compensation of the measured voltage values by at least one influencing factor. For example, a voltage at the piezoelectric element decreases relatively rapidly through the measurement circuit. The charge losses caused by the measurement of the voltage values can be suitably compensated in order to provide very precise signals. In addition, the air pressure present in the tire, the temperature, the tire rigidity or the loading of the vehicle can influence the voltage values delivered by the piezoelectric element, so that here too suitable compensation can be provided. More accurate measurement results are possible by means of the additional compensation step.

In one embodiment, each record corresponds to a characteristic that indicates the signals to be expected or actual data to be expected for each rotation angle of the piezoelectric element at the profile depth associated with the record. A rotation angle of the piezoelectric element shall mean in this case a rotation angle between a line extending from a center point of the tire through the piezoelectric element and a reference line extending from the central point of the tire in a predetermined direction. Said predetermined direction can be for example a direction that points vertically upwards from the central point of the tire or even vertically downwards.

With said embodiment, the signals or the actual data are compared with the characteristics, especially in a rotation angle region of the piezoelectric element in which entry of the piezoelectric element into the contact area and/or exiting of the piezoelectric element from the contact area takes place. Said embodiment is particularly advantageous since the signals of the piezoelectric element or the actual data derived therefrom enable a particularly simple estimation of the profile depth of the tire.

In one embodiment the step of deriving actual data from the measured signals includes the steps of determining a first summation value by accumulating signals corresponding to a gentler curvature of the piezoelectric element than a normal curvature of the piezoelectric element and/or of determining a second summation value by accumulating signals corresponding to a tighter curvature of the piezoelectric element than a normal curvature of the piezoelectric element. In general, the piezoelectric element has a gentler curvature than a normal curvature if the piezoelectric element is in the contact area. By contrast, a condition is determined in which the piezoelectric element generally experiences tighter curvature during entry into the contact area and during the exit from the contact area. A ratio between the first and the second summation values can be determined in this case.

For analyzing the actual data derived in this way, the comparison data can specify first summation values to be expected or ratios between the first and second summation values to be expected for different profile depths.

By the formation of summation values the method is particularly robust against isolated measurement errors, because measurement values can be accumulated over many wheel rotations before an assignment to the relevant comparison data takes place.

The step of deriving actual data from the measured signals can also include the step of determining a geometric profile of the piezoelectric element while the tire is rolling. In this case the comparison data preferably indicate geometric profiles of the piezoelectric element to be expected depending on the profile depth. An estimate of the profile depth can then be carried out by means of a comparison of the determined geometric profile of the piezoelectric element with the appropriate comparison data.

In one embodiment the step of deriving actual data from the measured signals includes the step of spectral analysis of the measured signals in order to determine the frequencies and their amplitudes contained in the signals. In this case the comparison data preferably indicate the frequencies and their amplitudes to be expected for different profile depths. An estimate of the profile depth can then take place by means of a comparison of the measured frequencies and their amplitudes with the comparison data.

In this case preferably only those measured signals are subjected to the spectral analysis that arise in a rotation angle region of the piezoelectric element that lies in a direction of rotation of the tire between a rotation angle at which exiting of the piezoelectric element from the contact area takes place and a rotation angle at which entry of the piezoelectric element into the contact area takes place. The region of the rotation angle of the piezoelectric element that corresponds to the tire contact area is thus not included, because only vibrations that are too small occur in said rotation angle region because of the direct contact with the road. In practice, there can be a convolution of the vibrations that occur during the transition through the contact area and the other vibrations. A homomorphic filter can be used in order to filter out the desired vibrations.

In addition, the invention comprises a method for warning a driver of the vehicle with the steps of the method according to the invention for estimating a profile depth of a tire of a vehicle during the operation of the vehicle and the steps for comparing the estimated profile depth with a threshold value and outputting a warning signal to the driver if the estimated profile depth is below the threshold value. This not only enables a profile depth of the tire to be estimated, but enables the driver of the vehicle to be suitably warned if the profile depth is too low.

Moreover, the present invention comprises a suitable device for estimating a profile depth of a tire of a vehicle during the operation of the vehicle. The device according to the invention comprises in this case a measuring device for measurement of signals of a piezoelectric element, wherein the piezoelectric element is disposed on the inside of the tire in a region that is deformed when passing through a contact area. The device according to the invention also comprises a comparing device for comparing the signals or actual data derived from the signals with comparison data as well as an estimating device for estimating the profile depth based on the comparison of the signals or the actual data with the comparison data. In this case the comparison data can contain records that indicate signals to be expected or actual data to be expected for each profile depth.

In one embodiment the device comprises means for deriving actual data from the measured signals. Said means can in turn comprise means for determining a first summation value by accumulating signals corresponding to a gentler curvature of the piezoelectric element than a normal curvature of the piezoelectric element and/or means for determining a second summation value by accumulating signals that correspond to a tighter curvature of the piezoelectric element than a normal curvature of the piezoelectric element.

The features of the invention have been described in relation to a method and/or in relation to a device. Unless explicitly stated otherwise, method features can be combined with device features and device features can be combined with method features. In particular, the device according to the invention comprises suitable means for carrying out the corresponding steps of the method. Other features of the method are also reflected in corresponding embodiments of the device. In order to avoid making the description of the invention unnecessarily long, a repetition of the method features in the form of device features is omitted. Said device features, which are obvious to the person skilled in the art, shall still apply as disclosed.

Further advantages and details of embodiments of the invention are explained below in relation to the figures.

DESCRIPTION OF THE INVENTION

Figure 1:
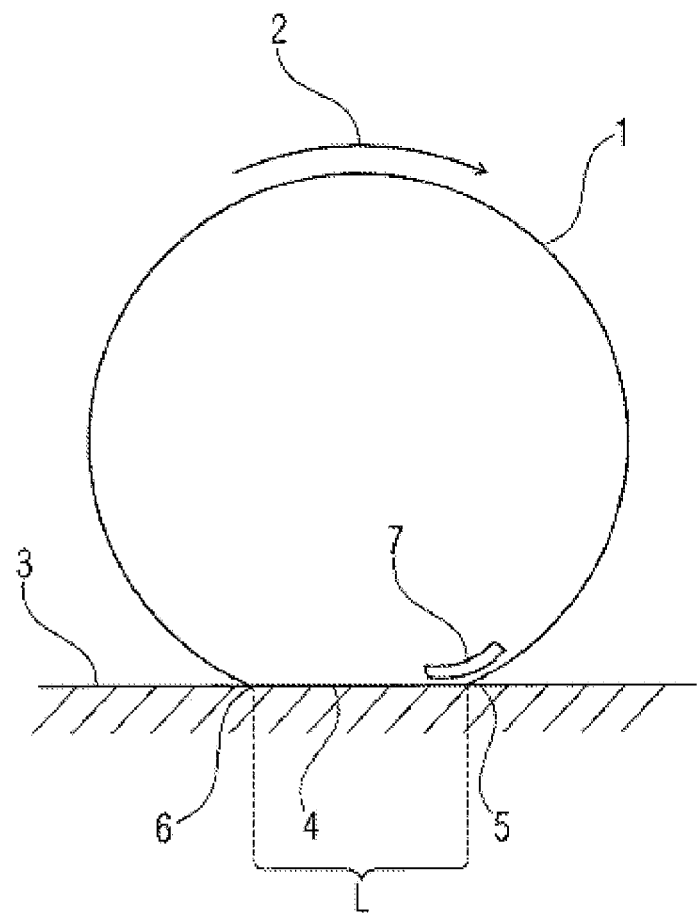
FIG. 1 shows an embodiment of a vehicle wheel fitted with a piezoelectric element.

In the explanations given in relation to the figures, the same and effectively the same features are provided with the same reference characters unless otherwise stated.

FIG. 1 shows a vehicle wheel with a tire 1 fitted with a piezoelectric element, the tire rolling in the direction of rotation 2. The rolling behavior is shown here in idealized form on level ground 3. There is a flattened footprint that is referred to as the contact area 4. The length L of the contact area is measured here from the entry into the contact area 5 to the exit from the contact area 6. The shape of the contact area 4 is dependent among other things on characteristic data of the tire, the wheel loading, the tire pressure and the speed of the vehicle. A wheel unit 7 is disposed in the tire 1. This comprises among other things a piezoelectric element, which is disposed on the inside of the tire such that it is deformed when passing through the contact area. In particular, an intensive deformation of the piezoelectric element occurs on entering the contact area 5 and on exiting from the contact area 6 as a result of kinking. Besides the piezoelectric element, the wheel unit 7 further comprises a battery, a processor, different sensors such as an air pressure sensor, a temperature sensor and an acceleration sensor, a processing unit and a transmitter.

Figures 2A, 2B:
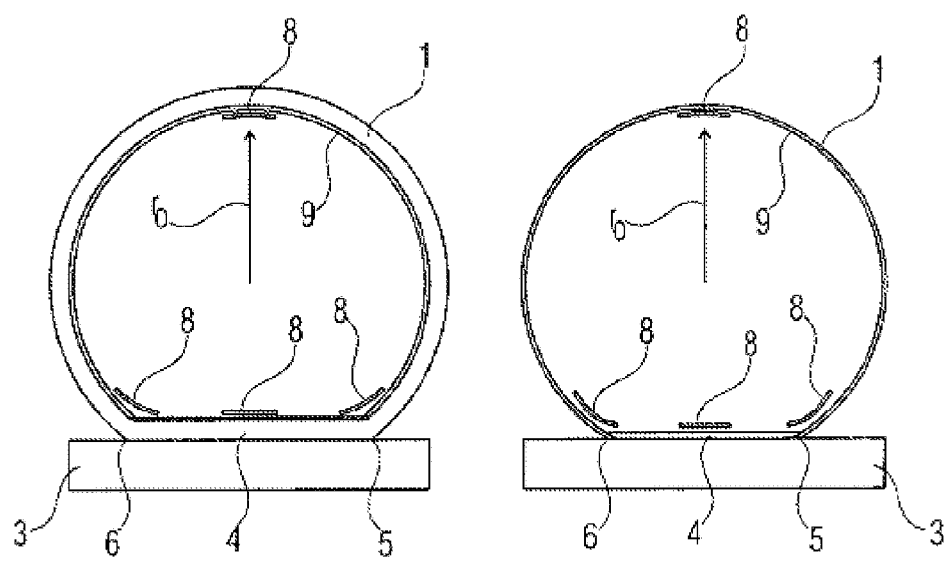
FIG. 2a shows different rotation angles of the piezoelectric element in the case of a new tire.
FIG. 2b shows different rotation angles of the piezoelectric element in the case of a used tire.

If the piezoelectric element is deformed by a mechanical force, it produces an electrical voltage that is a measure of the deformation of the piezoelectric element. FIGS. 2a and 2b show the piezoelectric element 8 at different positions of the tire 1. The tire 1 shown in FIG. 2a is new, whereas the tire 1 shown in FIG. 2b is worn. The piezoelectric element 8 is disposed on the neutral chord 9 of the tire. Said neutral chord 9 is characterized in that it is indeed deformed, but is neither stretched nor shortened. The tire wear thereby occurs outside the neutral chord, so that the radius r0 of the neutral chord 9 is identical for both a new tire and a worn tire.

As can be seen in FIGS. 2a and 2b, the piezoelectric element 8 has a normal curvature when it is in the top of the tire. At the entry into the contact area 5 and at the exit from the contact area 6 the piezoelectric element 8 is curved more tightly in comparison with the normal curvature and in the center of the contact area 4 is curved more gently.

The two FIGS. 2a and 2b suggest that the kink at the entry into the contact area 5 and at the exit from the contact area 6 for the worn tire shown in FIG. 2b is sharper than in the case of the new tire illustrated in FIG. 2a, because the abundant rubber present outside the neutral chord 9 in the case of the new tire attenuates the kinking effect. Said effect can be used to estimate the profile depth.

Figure 3:
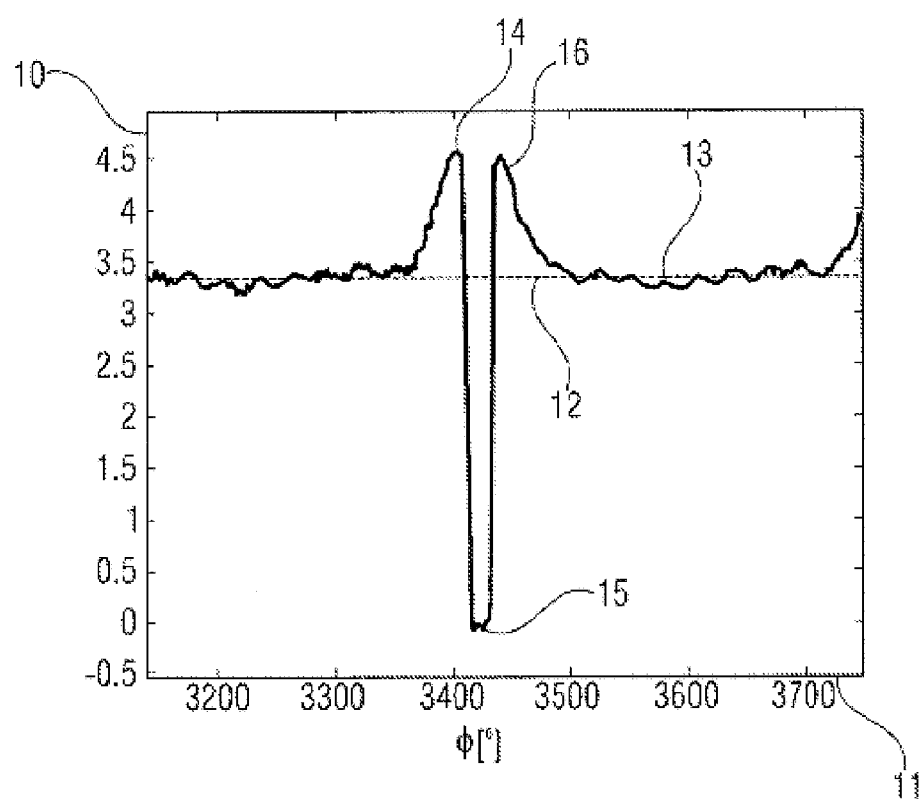
FIG. 3 shows a curvature of a piezoelectric element during a wheel rotation.

FIG. 3 illustrates a curvature of the piezoelectric element 8 during a wheel rotation. The curvature of the piezoelectric element is shown in units of 1/meter on the ordinate axis 10. In this case a radius r0 of 30 cm was assumed. The rotation angle $\Phi$ of the piezoelectric element 8 is plotted on the abscissa axis 11. The tenth rotation of the piezoelectric element thus extends from 3240 degrees to 3600 degrees. The contact area 4 is at 3420 degrees, so that the piezoelectric element 8 has a curvature of 0. The representation in FIG. 3 thus also shows that the reference line from the central point of the tire extends vertically upwards. Curvature values greater than normal curvature occur shortly before the contact area, i.e. at the entry into the contact area, and shortly after the contact area, i.e. at the exit from the contact area. Said normal curvature, which can be designated with 1/r0, is indicated by the line 12. On the curve 13, point 14 corresponds to the entry into the contact area 5, point 15 corresponds to the contact area 4 and point 16 corresponds to the exit from the contact area 6.

Figure 4:
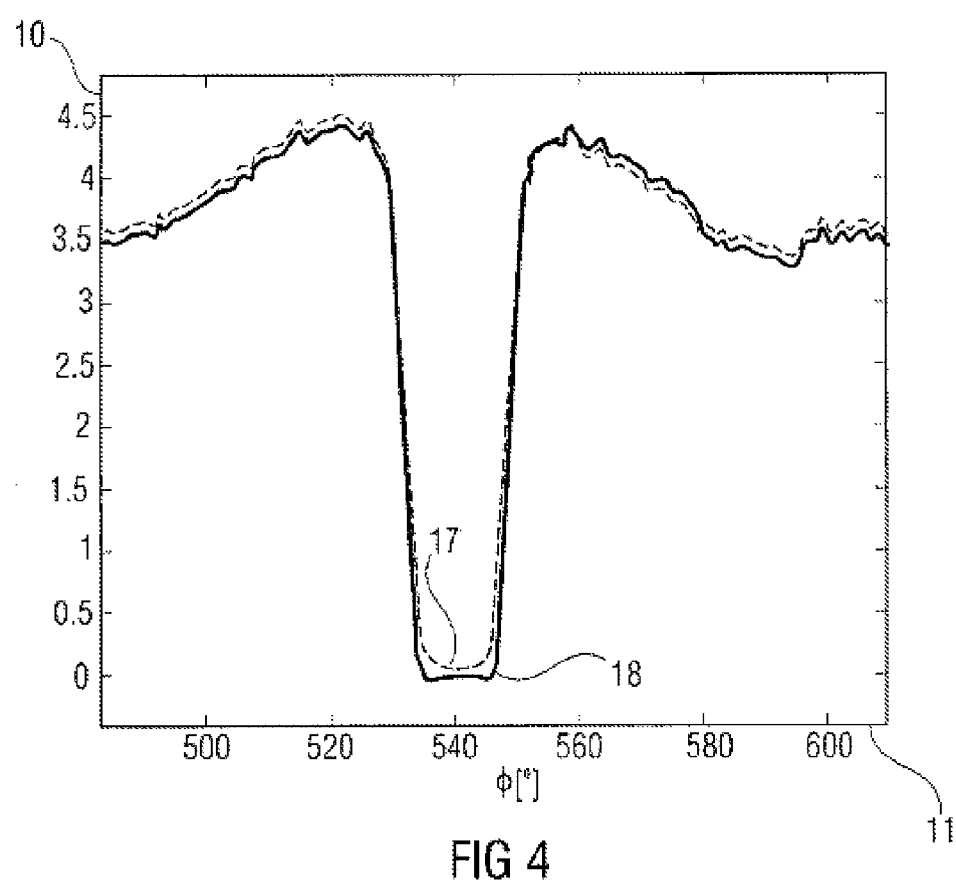
FIG. 4 shows an embodiment of a signal profile of a piezoelectric element in the case of a worn tire in comparison with a new tire.

FIG. 4 once again shows the curvature of the piezoelectric element 8 in the case of a new tire 17 against the curvature profile of the piezoelectric element in the case of a worn tire 18. It can be clearly seen from FIG. 4 that the curvature profile of the curve 17 is more rounded at the entry to the contact area and at the exit from the contact area. This effect can be used for estimating the profile depth.

Figure 5:
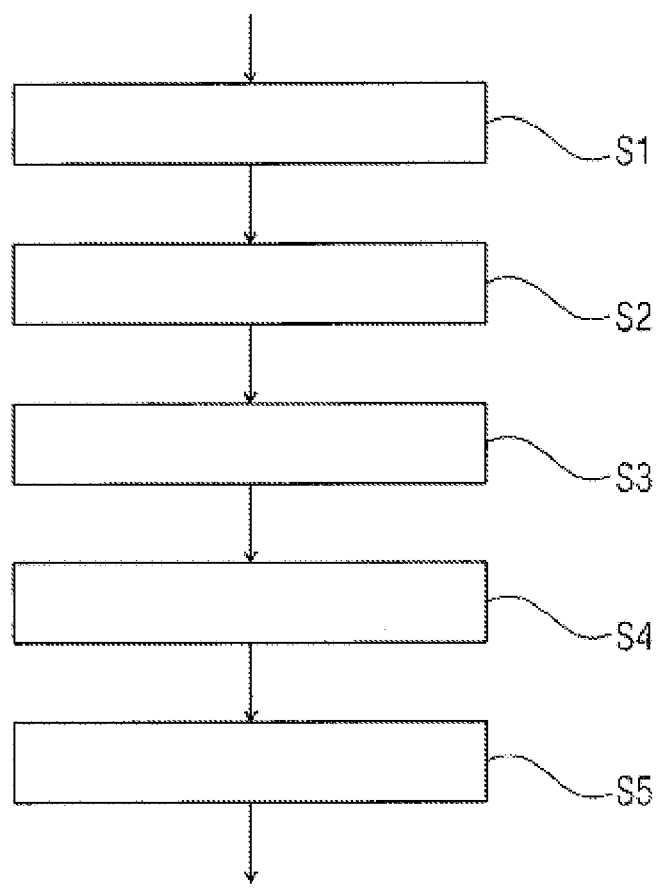
FIG. 5 shows a first embodiment of a method according to the invention for estimating a profile depth of a tire.
Figure 6:
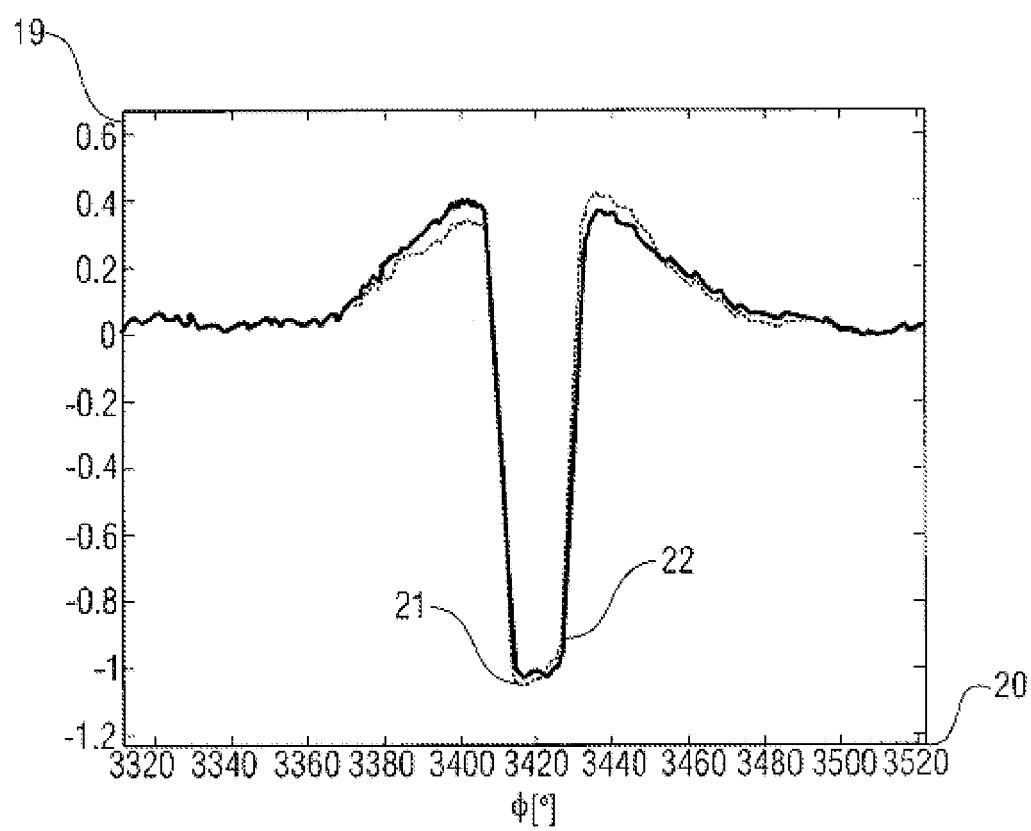
FIG. 6 shows a possible voltage profile of the piezoelectric element in uncompensated and in compensated form.

FIG. 5 illustrates a first embodiment of a method according to the invention for estimating a profile depth of a tire of a vehicle. In step S1 the signals of the piezoelectric element are first measured. Said piezoelectric element 8 is, as has already been mentioned, disposed on the inside of the tire 1 in a region that is deformed when passing through a contact area. In step S2 actual data are then derived from the measured signals in the form of voltage values of the piezoelectric element. The measured voltage values are compensated for this purpose. For example, charge losses arising as a result of the measurement of the voltage values are taken into account. This is illustrated in FIG. 6. The voltage values are plotted in volts on the abscissa axis 20 and the rotation angle $\Phi$ of the piezoelectric element is removed on the ordinate axis 19. The curve 21 corresponds to the uncompensated voltage values and the curve 22 to the compensated voltage values. As can be seen from curve 21, the magnitude of the voltage value decreases rapidly in the contact area. However, because this does not correspond to a change in the curvature of the piezoelectric element, but is due to charge loss caused by the measurement, this voltage decrease is compensated.

The relationship between the voltage loss $U_{Loss}$ and the measured piezoelectric voltage $U_p$ can be described by means of the following differential equation:

$$\frac{d}{dt} U_{Loss}(t) = C_L * U_p(t)$$

The constant $C_L$ can be calculated using the capacitance C of the piezoelectric element and the total loss impedance R:

$$C_L = \left(\frac{1}{RC}\right).$$

In step S3 shown in FIG. 5, the actual data derived in step S2 are compared with comparison data. In the present example the comparison data correspond to characteristics, each of which is associated with a profile depth and each of which indicates actual data to be expected for each rotation angle of the piezoelectric element.

In step S4 the record of the comparison data, i.e. the characteristic, is determined that has the greatest similarity to the actual data. In step S5 the profile depth is then estimated by determining a profile depth associated with the record. An example of a characteristic is the curve in FIG. 4 that is denoted by 17.

Figure 7:
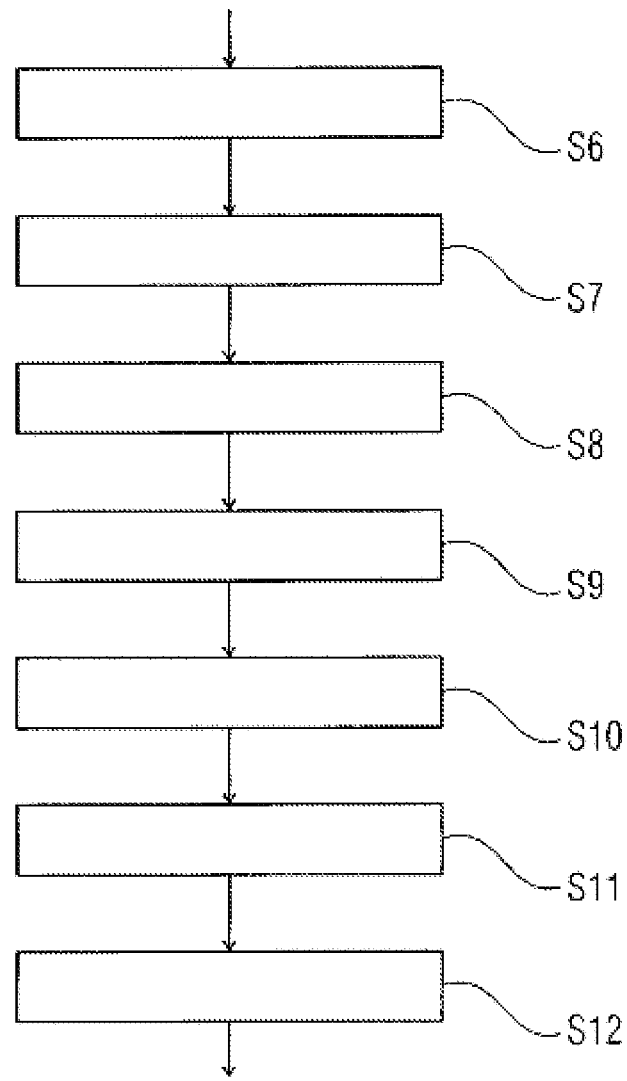
FIG. 7 shows a second embodiment of a method according to the invention for estimating a profile depth of a tire.

FIG. 7 shows a second embodiment of a method according to the invention for estimating a profile depth of a tire of a vehicle. In step S6 signals of the piezoelectric element are first measured. In steps S7 to S9 actual data are derived from the measured signals. Initially in step S7 a first summation value is determined by accumulating signals corresponding to a gentler curvature of the piezoelectric element than a normal curvature of the piezoelectric element. In step S8 a second summation value is determined by accumulating signals corresponding to a tighter curvature of the piezoelectric element than a normal curvature of the piezoelectric element. The first and second summation values are set in a ratio to each other in step S9.

Figure 8:
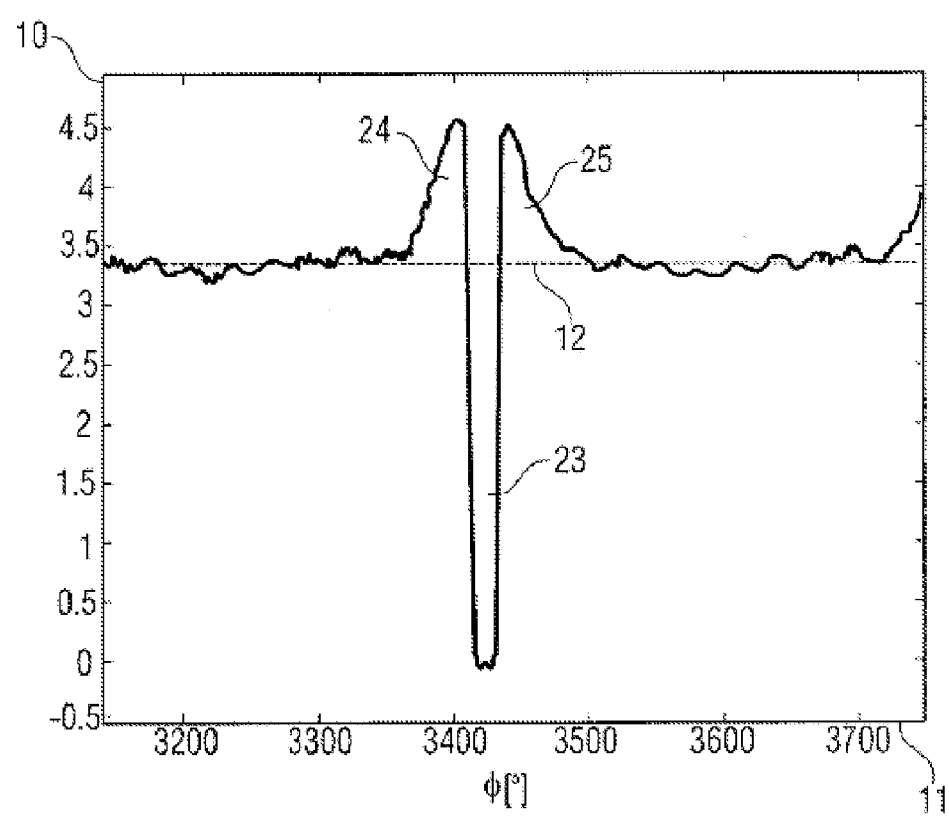
FIG. 8 shows a possible signal profile of the piezoelectric element.

Said relationships will be explained once again in relation to FIG. 8. FIG. 8 shows a curvature of the piezoelectric element as a function of the rotation angle of the piezoelectric element. The curvature of the piezoelectric element is plotted on the ordinate axis 10 and the rotation angle Φ of the piezoelectric element is plotted on the abscissa axis 11. The normal curvature is illustrated using the line 12. The area 23 corresponds to the first summation value, because in said region there is a gentler curvature of the piezoelectric element than a normal curvature. The areas 24 and 25 correspond to the second summation value. This is because here there is a tighter curvature of the piezoelectric element than a normal curvature. The area 23 is then set in a ratio to the total area of 24 and 25.

Figure 9:
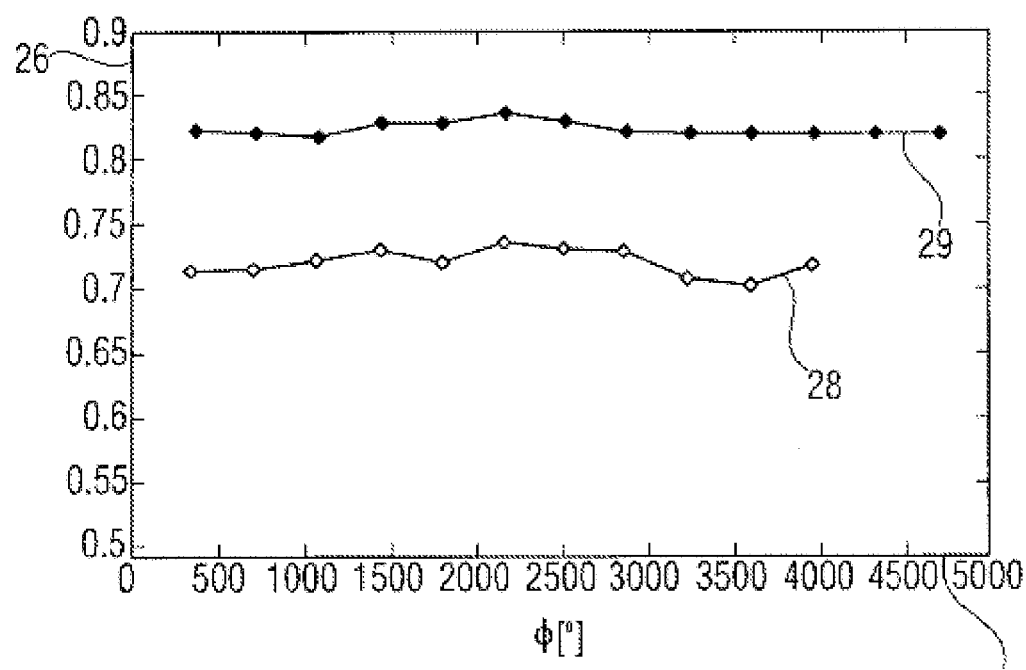
FIG. 9 shows an example of ratios of first to second summation values in the cases of a new tire and a worn tire.

In step S10 the actual data thus obtained are compared with comparison data. FIG. 9 shows this relationship. The ratio between the first and second summation values is shown on the ordinate axis 26. The rotation angle of the piezoelectric element Φ is in turn on the abscissa axis 27. The points on the lower graph 28 correspond to the ratio between the first and the second summation value for a new tire and the points on the upper graph 29 correspond to said ratio for a worn tire. It can thus be seen that the ratio between the first and second summation values is significantly different for a new tire and a worn tire.

In step S11 shown in FIG. 7 the record of the comparison data that has the greatest similarity to the actual data is determined. In step S12 the profile depth is then estimated by determining a profile depth associated with the record.

Figure 10:
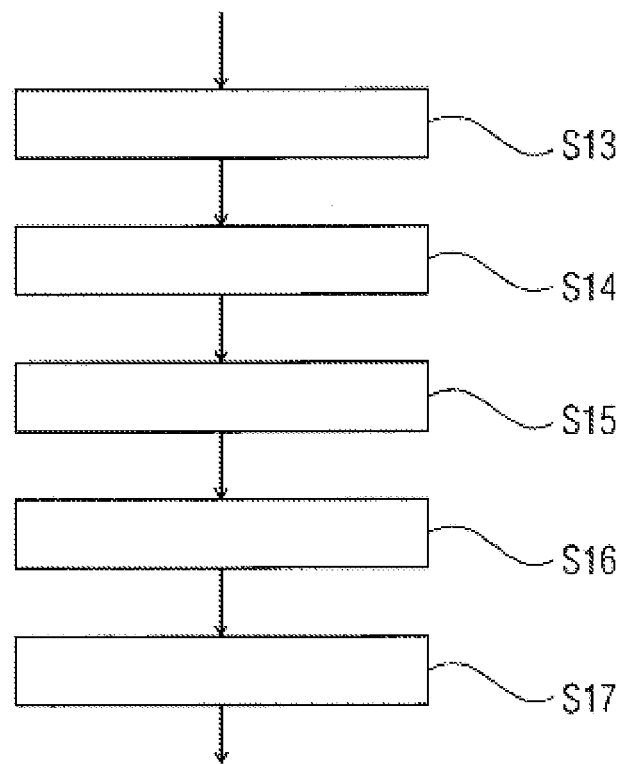
FIG. 10 shows a third embodiment of a method according to the invention for estimating a profile depth of a tire.

FIG. 10 shows a third embodiment of a method according to the invention for estimating a profile depth of a tire of a vehicle. In step S13 signals of the piezoelectric element are measured, from which actual data are derived in step S14. In the present case a geometric profile of the piezoelectric element is determined for when the tire is rolling. This can for example be carried out by means of the following differential equation:

$$K(\phi) = \frac{r^2 + 2rr' - rr''}{(r^2 + r'^2)^{3/2}}$$

Here $K(\Phi)$ is the curvature dependent on the rotation angle of the piezoelectric element. r denotes the radius, i.e. the distance between the piezoelectric element and the center point of the wheel. r' is the first derivative of r against the angle Φ and r'' is the second derivative of r against the angle Φ. The curvature $K(\Phi)$ can be determined using the measured signals. The radius can be determined depending on the rotation angle Φ by solving the differential equation shown above. This gives the coordinates that describe the geometric profile of the piezoelectric element.

Figure 11:
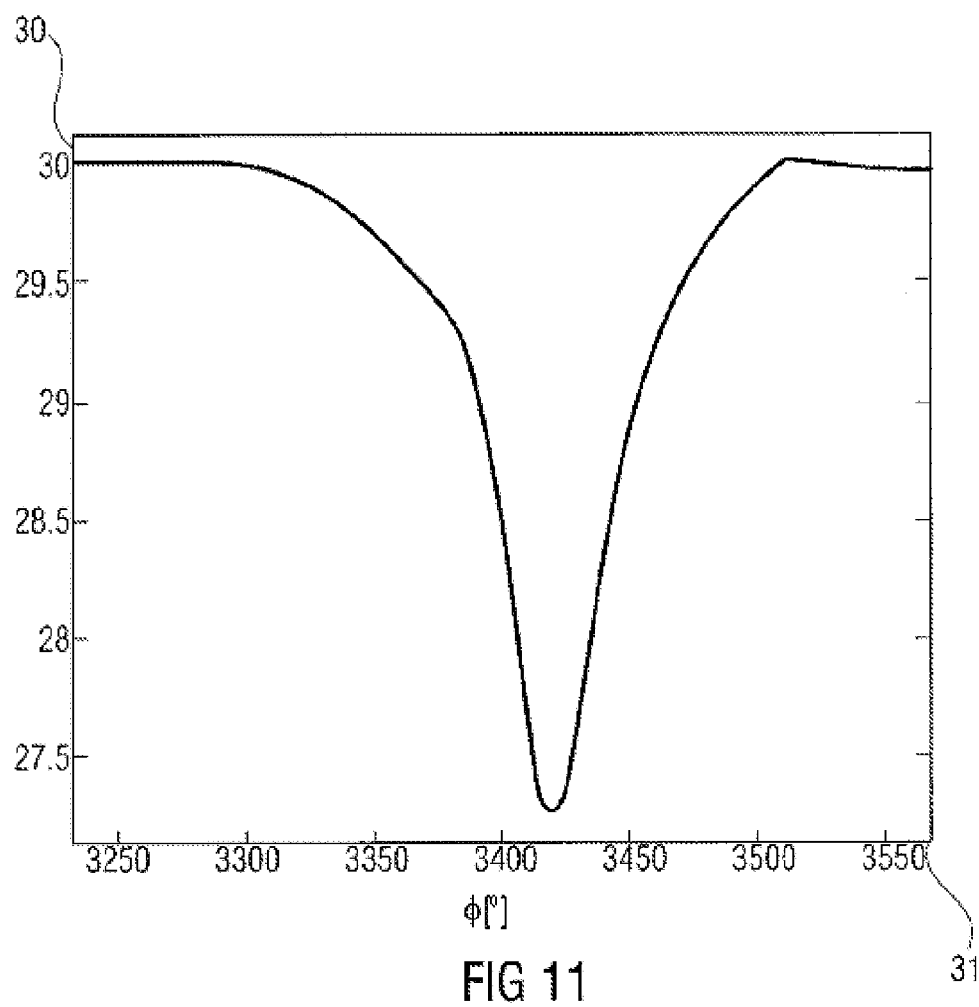
FIG. 11 shows a possible distance of the piezoelectric element from the center point of the wheel during a rotation of the wheel.

FIG. 11 indicates said relationship. The radius r is shown in cm on the ordinate axis 30 and the rotation angle Φ of the piezoelectric element is shown on the abscissa axis 31. As can be seen from FIG. 11, the distance between the piezoelectric element and the center point of the tire reduces in the region of the contact area.

Figure 12:
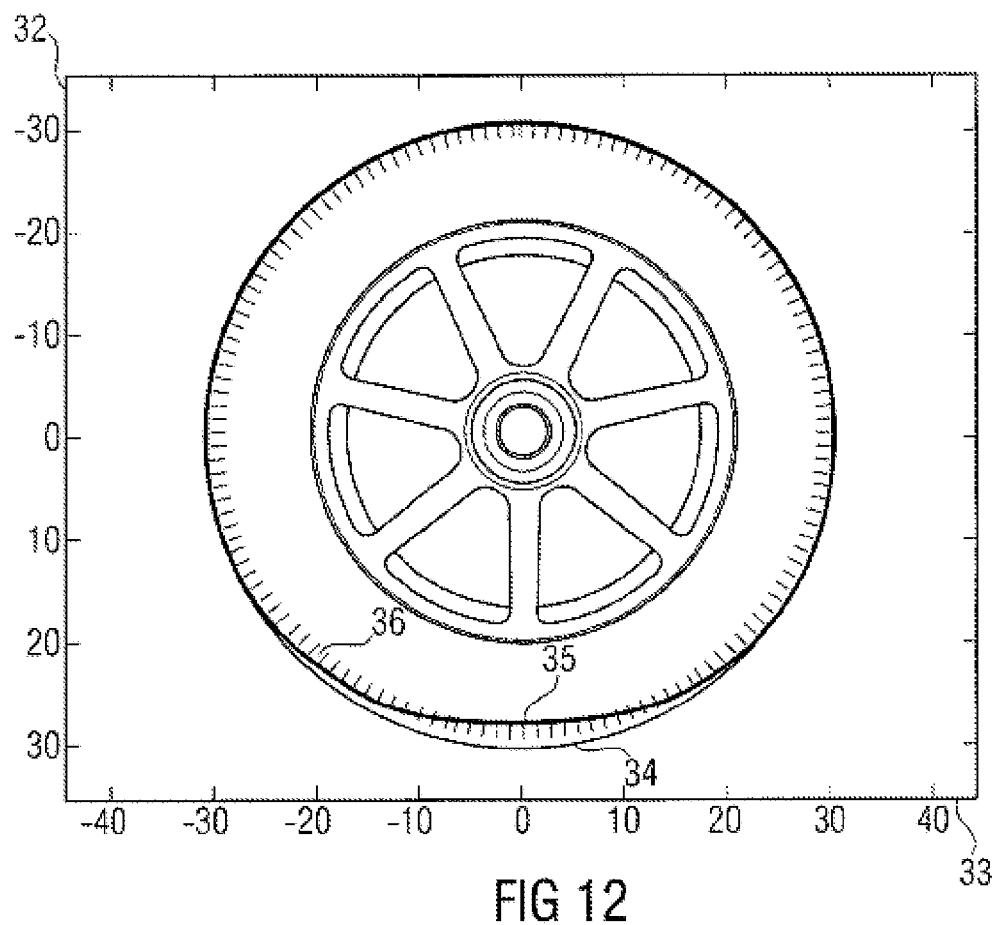
FIG. 12 shows an example of a geometric profile of the piezoelectric element while the tire is rolling.

In FIG. 12 said relationship is shown once again in a different way. Lengths are plotted on the ordinate axis 32 and abscissa axis 33 respectively in cm. The curve 34 indicates a perfect circle with the radius r0. The curve 35 represents the geometric profile of the piezoelectric element. The curvature field is indicated by the curve 36.

In step S15 that is illustrated in FIG. 10 the actual data thus obtained, i.e. the geometric profile of the piezoelectric element, are compared with comparison data. In step S16 the record of the comparison data that has the greatest similarity to the actual data is determined. The profile depth is then estimated in step S17 by determining a profile depth associated with the determined record.

Figure 13:
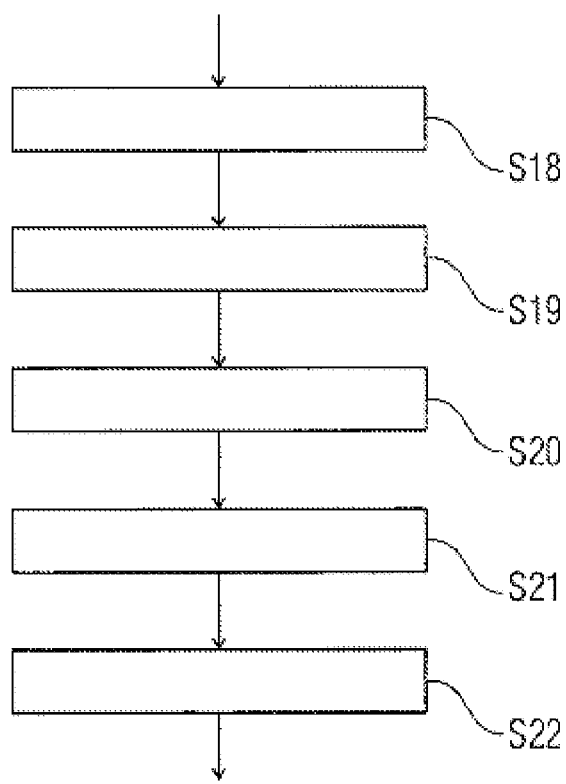
FIG. 13 shows a fourth embodiment of a method according to the invention for estimating a profile depth of a tire.

FIG. 13 illustrates a fourth embodiment of a method according to the invention for estimating a profile depth of a tire of a vehicle. In step S18, signals of the piezoelectric element are measured, from which actual data are derived in step S19. In the present example this takes place by means of a spectral analysis of the measured signals in order to determine the frequencies and their amplitudes contained in the signals. In step S20 the actual data thus derived are compared with the comparison data.

Figure 14:
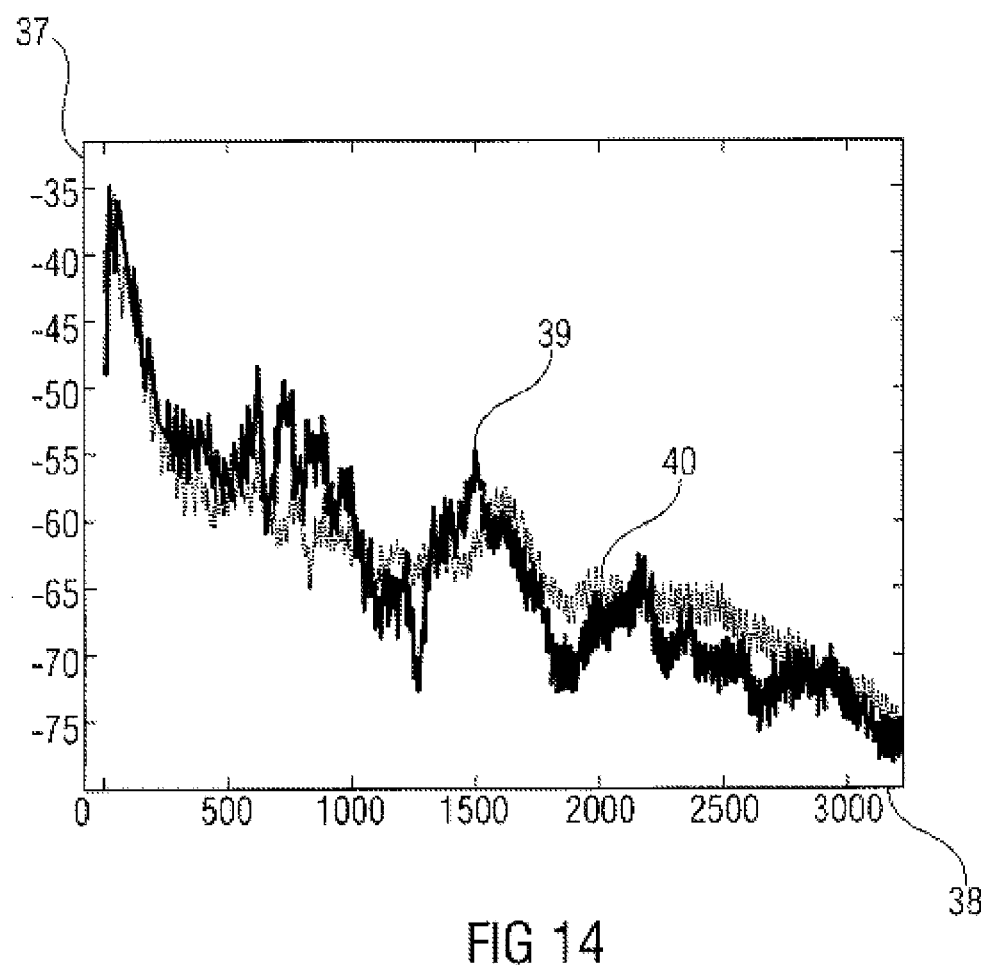
FIG. 14 shows frequencies and amplitudes of a measured signal of a used tire in comparison with the frequency and amplitudes of a new tire and FIG. 15 shows an embodiment of a device according to the invention for estimating a profile depth of a tire of a vehicle.

This process is illustrated in FIG. 14 once again. The amplitude in decibels is plotted on the ordinate axi 37 and the frequency in Hertz is plotted on the abscissa axis 38. The curve 39 corresponds to the actual data of a worn tire, whereas the curve 40 represents the comparison data of a new tire. As can be seen from FIG. 14, the curves 39 and 40 differ significantly, so that a worn tire can also be distinguished from a new tire based on a spectral analysis.

Preferably, only those measured signals are included in the spectral analysis that occur in a rotation angle region of the piezoelectric element that lies in a direction of rotation of the tire between a rotation angle at which the exit from the contact area of the piezoelectric element occurs and a rotation angle at which the entry into the contact area of the piezoelectric element occurs. In practice, a convolution of the vibrations associated with passing through the contact area with the other vibrations can occur. The signals that arise while the piezoelectric element is in the contact area will be filtered out. The individual vibrations are separated and are then analyzed using a homomorphic filter.

In the step S21 shown in FIG. 13 the record of the comparison data that has the greatest similarity to the actual data is determined. The profile depth is then estimated in step S22 by determining the profile depth associated with the record.

Figure 15:
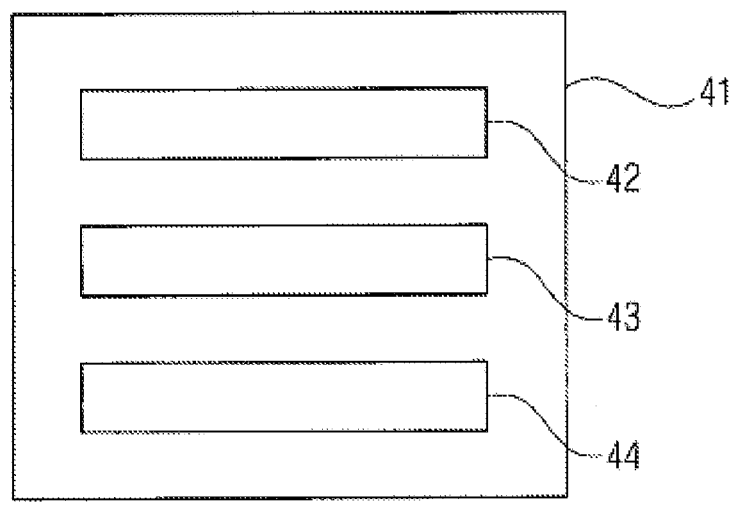

FIG. 15 shows an embodiment of a device according to the invention for estimating a profile depth of a tire of a vehicle during the operation of the vehicle. The embodiment 41 shown comprises a measuring device 42 for the measurement of signals of a piezoelectric element that is disposed on the inside of the tire in a region that is deformed when passing through the contact area. Moreover, the device 41 comprises a comparing device 43 for comparing the signals or actual data derived from the signals with comparison data and an estimating device 44 for estimating the profile depth based on the comparison of the signals or the actual data with the comparison data. The comparison data can contain records that indicate signals to be expected or actual data to be expected for each profile depth.

The explanations given in relation to the figures are purely illustrative and are not to be considered to be limiting. Many changes may be made to the embodiments described without departing from the scope of protection as defined in the accompanying claims. In particular, the features of the embodiments can be combined with each other in order to provide further embodiments optimized for the intended use in this way.

REFERENCE CHARACTER LIST

1 tire
2 direction of rotation
3 ground
4 contact area
5 entry into the contact area
6 exit from the contact area
7 wheel unit
8 piezoelectric element
9 neutral chord
10 ordinate axis, on which the curvature is given in 1/meter
11 abscissa axis, on which the rotation angle Φ of the piezoelectric element is plotted
12 normal curvature $$\left(\frac{1}{r0}\right)$$

13 curvature graph
14 entry into the contact area
15 contact area
16 exit from the contact area
17 curvature graph of a new tire
18 curvature graph of a worn tire
19 ordinate axis, on which the voltage is plotted in volts
20 abscissa axis on which the rotation angle Φ of the piezoelectric element is plotted
21 uncompensated voltage profile
22 compensated voltage profile
23 area corresponding to a first summation value determined by accumulating signals corresponding to a gentler curvature of the piezoelectric element than a normal curvature of the piezoelectric element
24, 25 area corresponding to a second summation value determined by accumulating signals corresponding to a tighter curvature of the piezoelectric element than a normal curvature of the piezoelectric element
26 ordinate axis, on which the ratio between first and second summation values is plotted
27 abscissa axis on which the rotation angle Φ of the piezoelectric element is plotted
28 ratio between first and second summation values of a new tire
29 ratio between first and second summation values of a worn tire
30 ordinate axis, on which the radius in cm is plotted
31 abscissa axis, on which the rotation angle Φ of the piezoelectric element is plotted
32 ordinate axis with length in cm
33 abscissa axis with length in cm
34 perfect circle with radius r0
35 geometric profile of the piezoelectric element
36 curvature field
37 ordinate axis, on which the amplitude in decibels is plotted
38 abscissa axis, on which the frequency in Hertz is plotted
39 spectral analysis for a worn tire
40 spectral analysis for a new tire
41 embodiment of a device according to the invention
42 measuring device
43 comparing device
44 estimating device
L length of the contact area
S1 measurement of signals of a piezoelectric element
S2 deriving actual data from the measured signals by compensating the measured voltage values
S3 comparing the actual data with comparison data
S4 determining a record of the comparison data with the greatest similarity to the actual data.
S5 estimating the profile depth by determining the profile depth associated with the record
S6 measurement of signals of a piezoelectric element
S7 determining a first summation value by accumulating signals corresponding to a gentler curvature of the piezoelectric element than a normal curvature of the piezoelectric element
S8 determining a second summation value by accumulating signals corresponding to a tighter curvature of the piezoelectric element than a normal curvature of the piezoelectric element
S9 determining a relationship between the first and the second summation values
S10 comparing the actual data with the comparison data
S11 determining a record of the comparison data having the greatest similarity with the actual data
S12 estimating the profile depth by determining the profile depth associated with the record
S13 measurement of signals of a piezoelectric element
S14 deriving actual data from the measured signals by determining a geometric profile of the piezoelectric element
S15 comparing the actual data with comparison data
S16 determining a record of the comparison data having the greatest similarity with the actual data
S17 estimating the profile depth by determining the profile depth associated with the record
S18 measurement of signals of a piezoelectric element
S19 deriving actual data from the measured signals by spectral analysis of the measured signals in order to determine the frequencies and their amplitudes contained in the signals
S20 comparing the actual data with comparison data
S21 determining a record of the comparison data having the greatest similarity with the actual data
S22 estimating the profile depth by determining the profile depth associated with the record

The invention claimed is:
1. A method for estimating a profile depth of a tire of a vehicle during an operation of the vehicle, which comprises the steps of:

measuring signals of a piezoelectric element disposed on an inside of the tire in a region that is deformed when passing through a contact area;

deriving the actual data from the signals measured by determining a first summation value by accumulating signals corresponding to a gentler curvature of the piezoelectric element than a normal curvature of the piezoelectric element or determining a second summation value by accumulating signals corresponding to a tighter curvature of the piezoelectric element than the normal curvature of the piezoelectric element;

comparing the actual data derived from the signals with comparison data, the comparison data containing records that indicate expected actual data for each of a plurality of profile depths; and estimating the profile depth based on a comparison of the signals or the actual data with the comparison data.

2. The method according to claim 1, which further comprises:

determining a record of the comparison data that has a greatest similarity to the actual data; and estimating the profile depth by determining a profile depth associated with the record.

3. The method according to claim 1, which further comprises:

measuring voltage values of the piezoelectric element as the signals; and performing the step of deriving the actual data from the signals measured with the further step of compensating the voltage values measured by at least one influencing factor that is dependent on a tire pressure, on a tire temperature, on a tire rigidity, on a loading of the vehicle or on charge losses arising as a result of a measurement of the voltage values.

4. The method according to claim 1, wherein a record corresponds to a characteristic curve that indicates the expected actual data at the profile depth associated with the record for each rotation angle of the piezoelectric element, the rotation angle of the piezoelectric element meaning the rotation angle between a line that extends from a central point of the tire through the piezoelectric element and a reference line that extends from the central point of the tire in a predetermined direction.

5. The method according to claim 4, which comprises comparing the actual data with characteristics in a rotation angle region of the piezoelectric element in which entry of the piezoelectric element into the contact area and/or exiting of the piezoelectric element from the contact area occurs.

6. The method according to claim 1, wherein the step of deriving the actual data from the signals measured further includes determining a ratio between the first and the second summation values.

7. The method according to claim 1, wherein the comparison data indicates first summation values to be expected or ratios between the first and second summation values to be expected for different profile depths.

8. The method according to claim 1, wherein the step of deriving the actual data from the signals measured includes the further step of determining a geometric profile of the piezoelectric element while the tire is rolling, the comparison data indicating geometric profiles of the piezoelectric element to be expected depending on the profile depth.

9. The method according to claim 1, wherein the step of deriving the actual data from the signals measured includes the further the step of performing a spectral analysis of the signals measured to determine frequencies and amplitudes contained in the signals, the comparison data indicating the frequencies and the amplitudes to be expected for the different profile depths.

10. The method according to claim 9, wherein only the signals subjected to the spectral analysis that arise in a range of rotation angles of the piezoelectric element that lies in a direction of rotation of the tire between a rotation angle at which entry of the piezoelectric element into the contact area takes place and the rotation angle at which exiting of the piezoelectric element from the contact area takes place.

11. A method for warning a driver of a vehicle, which comprises the steps of:

measuring signals of a piezoelectric element that is disposed on an inside of a tire in a region that is deformed when passing through a contact area;

deriving the actual data from the signals measured by determining a first summation value by accumulating signals corresponding to a gentler curvature of the piezoelectric element than a normal curvature of the piezoelectric element or determining a second summation value by accumulating signals corresponding to a tighter curvature of the piezoelectric element than the normal curvature of the piezoelectric element;

comparing actual data derived from the signals with comparison data, the comparison data containing records that indicate expected actual data for each profile depth;

estimating a profile depth based on a comparison of the actual data with the comparison data;

comparing an estimated profile depth with a threshold value; and outputting a warning signal to the driver if the estimated profile depth is below the threshold value.

12. A device for estimating a profile depth of a tire of a vehicle during an operation of the vehicle, the device comprising:

a measuring device configured for measuring signals from a piezoelectric element that is disposed on an inside of the tire in a region that is deformed when passing through a contact area;

a device for deriving actual data from the signals measured with said measuring device by determining a first summation value by accumulating signals corresponding to a gentler curvature of the piezoelectric element than a normal curvature of the piezoelectric element or by determining a second summation value by accumulating signals corresponding to a tighter curvature of the piezoelectric element than the normal curvature of the piezoelectric element;

a comparing device configured for comparing actual data derived from the signals with comparison data, the comparison data containing records that indicate expected actual data for each profile depth; and an estimating device configured for estimating the profile depth based on a comparison of the actual data with the comparison data.

* * * * *